(12) United States Patent
Papajewski

(10) Patent No.: US 6,575,674 B2
(45) Date of Patent: Jun. 10, 2003

(54) REAMING TOOL AND PROCESS FOR ITS PRODUCTION

(75) Inventor: Jörg Papajewski, Albstadt (DE)

(73) Assignee: August Beck GmbH & Co., Winterlingen (DE)

( * ) Notice: Subject to any disclaimer, the term of this patent is extended or adjusted under 35 U.S.C. 154(b) by 0 days.

(21) Appl. No.: 09/860,684

(22) Filed: May 18, 2001

(65) Prior Publication Data
US 2001/0024602 A1 Sep. 27, 2001

Related U.S. Application Data

(62) Division of application No. 09/253,308, filed on Feb. 19, 1999, now Pat. No. 6,290,438.

(30) Foreign Application Priority Data

Feb. 19, 1998 (DE) .......................... 198 06 864

(51) Int. Cl.[7] .................. B23B 51/00; B21K 5/04
(52) U.S. Cl. .............. 408/145; 408/224; 76/108.1; 76/108.6; 407/63; 407/118
(58) Field of Search ................. 408/144, 145, 408/224; 407/31, 32, 118, 119, 53, 54, 62, 63; 76/108.1, 108.6

(56) References Cited

U.S. PATENT DOCUMENTS

| | | | | |
|---|---|---|---|---|
| 3,591,302 A | * | 7/1971 | Andreasson | 408/224 |
| 4,219,291 A | * | 8/1980 | Hoeh | 407/31 |
| 4,662,803 A | * | 5/1987 | Arnold | 408/224 |
| 4,679,971 A | * | 7/1987 | Maier | 408/145 |
| 5,226,760 A | * | 7/1993 | Nishimura | 408/144 |
| 5,272,940 A | * | 12/1993 | Diskin | 408/145 |
| 5,273,379 A | * | 12/1993 | Nishimura | 408/144 |
| 5,685,671 A | * | 11/1997 | Packer et al. | 408/144 |
| 5,868,885 A | * | 2/1999 | Cfockett et al. | 76/108.1 |
| 6,290,438 B1 | * | 9/2001 | Papajewski | 408/145 |

* cited by examiner

*Primary Examiner*—Steven C. Bishop

(57) ABSTRACT

A multi or single cutter reaming tool has a shaft and a shaped head with at least one cutter. The shaped head is produced from a blank having a base body of a base material on its envelope surface with at least one rectilinear or helical groove-shaped recess running around it, into which high hardness cutting material is sintered. The high hardness cutting material includes at least one cutter having cutting surfaces formed by the introduction of a chip groove by a grinding wheel into the base body and movement of the grinding wheel toward the high hardness cutting material.

18 Claims, 3 Drawing Sheets

REAMING TOOL AND PROCESS FOR ITS PRODUCTION

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Technical Field

This is a Divisional of U S. patent application Ser. 09/253,308 filed Feb. 19, 1999, now U.S. Pat. No. 6,290,438, of the same inventor.

The invention relates to a reaming tool and a process for its production.

Reaming tools are used for the fine machining of boreholes and therefore require a precise arrangement and design of chip removal elements and guide elements. In particular, a high degree of dimensional accuracy is desired.

2. Background Art

Reaming tools have already been known in which the chip removal elements or guide elements are set into a base body, for example by brazing or by adhesion. It has become known from German Patent DE 196 21 813 A1 to form a corresponding seating for the positioning of guide strips in order to make the seating of the inset chip removal elements and guide elements precise, so that these can be exactly positioned with respect to the base body. A considerable improvement was attained by this design.

However, the increasing quality requirements require a further improvement in the quality of reaming tools: for example, in the bonding between the chip removal elements and guide elements and the base body, and also with regard to the dimensional stability and to their production, in particular to cost-favorable production with consistent high quality.

For example, it is known, for milling tools or shaft milling tools, to use blanks with groove-shaped recesses which run along the envelope surface, and into which very hard cutting materials, such as, for example, PCD or CBN material, are sintered. Such blanks are processed by a spark erosion grinding process in order to produce shaft milling tools. Multi-cutter millers are concerned here for high performance machining.

SUMMARY OF THE INVENTION

The invention has as its object to provide a reaming tool and a process for its production, which tool can be produced cost-effectively, satisfies the high quality requirements, is flexible in design and construction, and reliably takes up the forces acting on it.

This object is attained according to the invention by a reaming tool with a shaft and a head on which at least one cutter is provided. The head is produced from a blank that comprises a base body of a base material with an envelope surface with at least one rectilinear or helical groove-shaped recess running around it, into which at least one high hardness cutting material is sintered. The high hardness cutting material comprises at least one cutter having cutting surfaces formed by the introduction of a chip groove by a grinding wheel into the base body, and movement of the grinding wheel toward the high hardness cutting material.

By the use of a blank which has on its envelope surface substantially rectilinear or helical groove-shaped recesses, into which high hardness cutting materials are sintered, a cost-favorable production and manufacture of a reaming tool can be provided. An expensive preparation for the introduction of seatings for chip removal elements and/or guide elements is dispensed with by the hard cutting material already present in the blank, since the sintered-in hard material layers can be used as chip removal strips and/or guide strips specifically according to the application, and can be machined to dimension. Furthermore, this advantageous embodiment makes it possible for the shaft of the reaming tool to be made of a cost-favorable material which can be positively connected, but however preferably non-positively connected, to the shaped head.

The use of blanks with high hardness cutting materials provided in groove-shaped recesses and running around the envelope surface at first appears to be erroneous. End milling tools in which the use of blanks is known are used for machining workpieces in the X-Y plane. The end miller then has, along its rotation axis, peripheral cutters constituted as a main cutter and coming into use in milling machining. The cutters arranged to the end of the milling tool play no, or only a very subsidiary, part. Furthermore, end millers operate at relatively high cutting speeds and depths of cut, so that quite other forces act on a head of an end miller.

In reaming tools, on the contrary, the machining and the chip formation are determined by completely different parameters and dimensions. In milling machining, the borehole is machined exclusively in the Z-direction, and in contrast machining in the X- and Y-directions is neither provided nor possible. Furthermore, at least one main cutter is arranged to the end of a reaming tool, and in contrast at least one auxiliary cutter is provided along the rotation axis and has essentially the task of guiding. The use of such blanks with high hardness cutting materials arranged in grooves and extending substantially coaxial to the rotation axis therefore would appear to be unsuitable, particularly when costs are taken into account. The same holds for the use of reaming tools because of the forces, parameters and requirements which deviate from milling technology, and which at first sight make the use appear to be erroneous to form the reaming tool by means of a blank which has on its envelope surface substantially rectilinear or helical groove-shaped recesses, into which high hardness cutting material is sintered.

However, by the constitution of a reaming tool according to the invention, the constitution of a reaming tool with twisted chip formation elements and/or guide elements is attained, which heretofore has not been possible. This can be made possible, for example, for a multi-cutter reamer which has cutters of high hardness cutting materials. A single cutter reaming tool with guide strips can likewise be provided, in which both the chip removal element and also the guide elements, or one of the two, is twisted. A considerable improvement can thereby be attained as regards the processing quality, the speed, and also the life of the tool. This is based on the fact that the chip removal elements and guide elements are sintered into the base body of the shaped head, so that a material joint of higher quality than the usual brazed joint can thereby result. Furthermore, the labor-consuming brazed joints and the production of seatings for plates or guide strips are dispensed with, together with the associated risks of defective brazed places which can arise because of negligent cleaning of the contact surfaces.

According to a further embodiment of the invention a PCD material is used as the high hardness cutting materials.

This can be used specifically for the application, corresponding to the material to be machined, such as for example the machining of nonferrous metals.

According to a further embodiment of the invention, a CBN material is used as the high hardness cutting material. This suitable material can be used corresponding to the further materials to be machined.

According to a further embodiment of the invention, the high hardness cutting materials are constituted as the chip removal element and/or guide element. Both elements have, due to the sintering process, a chemical connection to the base body of the blank, and because of the diffusion process which then takes place and which can, for example, give rise to a cobalt or nickel compound, has a substantially higher strength than a brazed or adhesive joint.

According to a further embodiment of the invention, the chip removal elements and the guide elements can be constituted as either right-twisted or left-twisted. The corresponding design of the reaming tool can thus be made possible according to the application.

According to a further embodiment of the invention, chip grooves can be made in the blank by grinding. Depending on the respective application, the high hardness cutting materials are ground to dimension for one or more cutters and guide strips, or solely for chip removal elements or guide elements. In both of the last alternatives, the guide elements or cutter elements can be supplemented by corresponding inserted elements.

According to a further embodiment of the invention, the length, or else only the forward portion, of the blank can be determined by the length of the auxiliary cutter, or by the length of the guide strip. It can then be provided that one or more blanks are arrayed, corresponding to the application: for example, in the case of stepped boreholes.

The object of the production of a reaming tool is attained by a process for production of a reaming tool with a shaft and a head with at least one cutter comprising positively connecting a shaft to a blank that has at least one groove-shaped recess arranged on its envelope surface into which high hardness cutting materials are sintered, bringing the external diameter of the blank to the exact dimension of the flight circle diameter of the at least one cutter, producing at least one chip groove in the blank, bringing to said exact dimension the at least one cutter, producing at least one chip groove in the blank with a grinding wheel, and bringing the at least one cutter to said dimension.

According to a further embodiment of the invention the grinding wheel is moved toward the recess receiving the high hardness cutting material, and a chip surface of the at least one cutter is brought to said dimension.

A reaming tool can be constituted according to the invention, which is substantially determined by the reduction of the individual working steps. By the employment of a blank with high hardness cutting materials provided in groove-shaped recesses on a shaft, the costly preparation of a base body in order to seat chip removal elements and guide elements, and the subsequent brazing of these, can be dispensed with. By the grinding of the blank to dimension, a rapid shaping of a reaming tool can be given by means of a single clamping. At the same time, a high constancy of dimensions can be given, since repeated resetting of the workpiece is not required. A reaming tool can thus be produced by the process according to the invention, in which both the at least one chip removal element and also the at least one guide element are constituted by the high hardness cutting material arranged on the blank.

Further alternative processes, of equal value, for the production of such reaming tools are given herein. Thereby, according to the application, chip removal elements or guide elements which are different from the chip removal elements or the guide elements arranged on the blank can be used, in order to fulfill the specific requirements. Furthermore, a reaming tool can be produced by an alternative according to the invention which, as a multi-cutter tool, consists exclusively of cutters which consist of the high hardness cutting materials provided on the blank.

BRIEF DESCRIPTION OF THE DRAWINGS

Embodiments are described hereinafter, taken together with the accompanying drawings, in which.

DETAILED DESCRIPTION OF EMBODIMENTS

Figure 1:
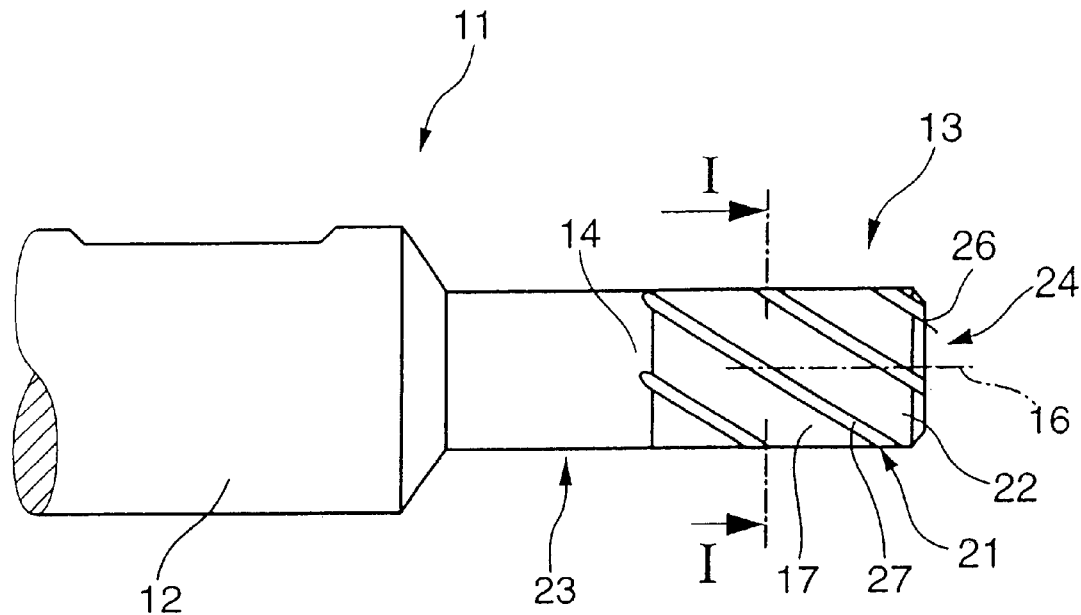
FIG. 1 shows a reaming tool according to the invention.

A reaming tool is shown in FIG. 1, which is used for the fine machining of boreholes. The reaming tool 11 has a shaft 12, which serves for clamping on a machine tool. A shaped head 13 for shaping is arranged on the shaft 12, preferably by means of a material joint to the shaft 12. Alternatively, a positive and/or non-positive joint can be provided. The shaped shaping head 13 advantageously has a centering nose 14 by means of which the shaped head 13 can be positioned rotationally symmetrically to the shaft 12. Further geometrical centering means can be provided so that the shaped head 13 and the shaft 12 have a common axis of rotation 16.

Figure 2A:
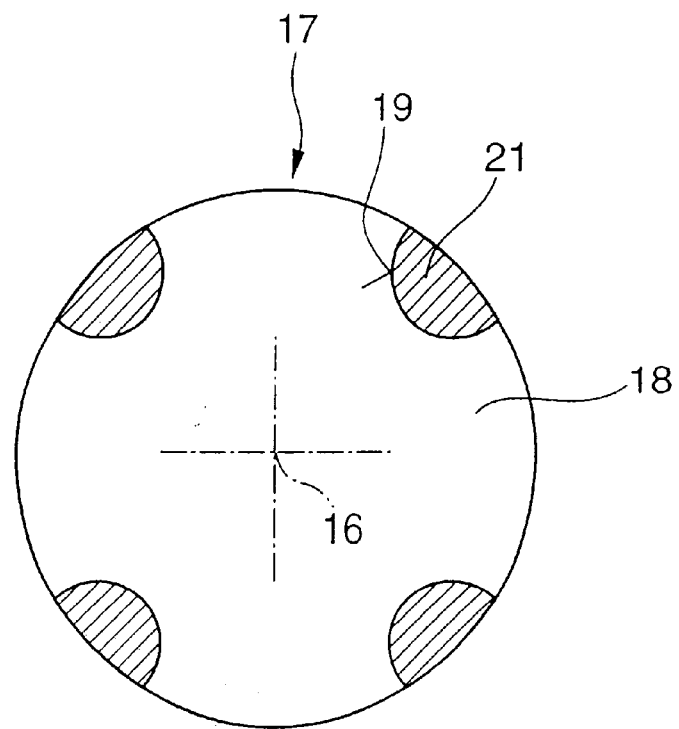
FIG. 2a shows a schematic cross section of an unmachined blank for the production of a reaming tool.

The shaped head 13 for shaping is machined from a blank 17. The blank 17 has a cross section as shown in FIG. 2a. Groove-shaped recesses 19 are provided in a base body 18 of the blank 17, and high hardness cutting materials 21 are sintered into them. In the embodiment according to FIG. 2a, the groove-shaped recess 19 is of a semicircular shape. The recess 19 can be rectangular, V-shaped or have further geometries, specific to the application. The base body 18 is advantageously formed of hard metal. Further materials can likewise be used, which are suitable for forming a material joint with the high hardness cutting materials by a diffusion process during the sintering process. A PCD or CBN material is in particular provided as the high hardness cutting material. The high hardness cutting materials 21 can be differently constituted as chip removal elements and guide elements.

Figure 2B:
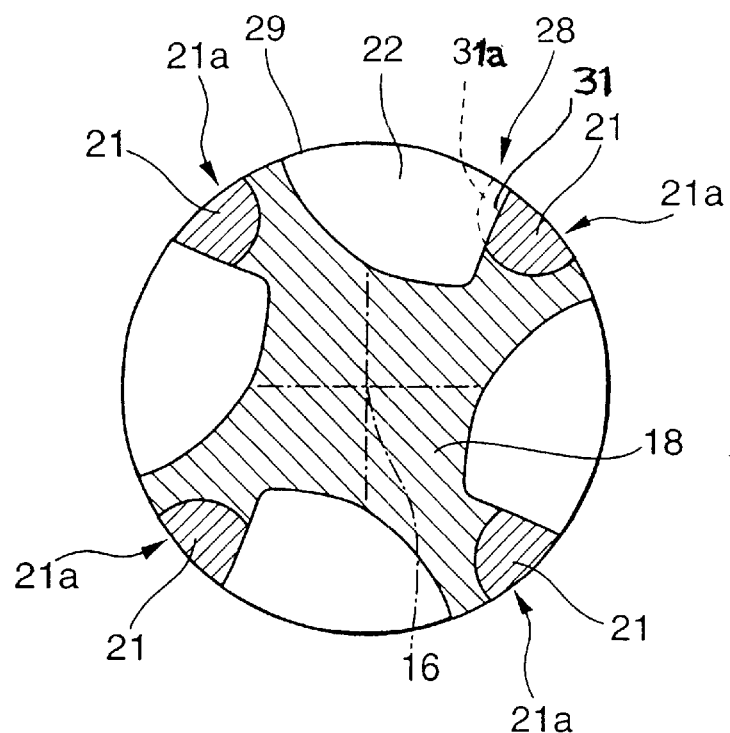
FIG. 2b shows a schematic representation in the cross section of a multi-cutter reaming tool along the line I—I in FIG. 1.
Figure 2C:
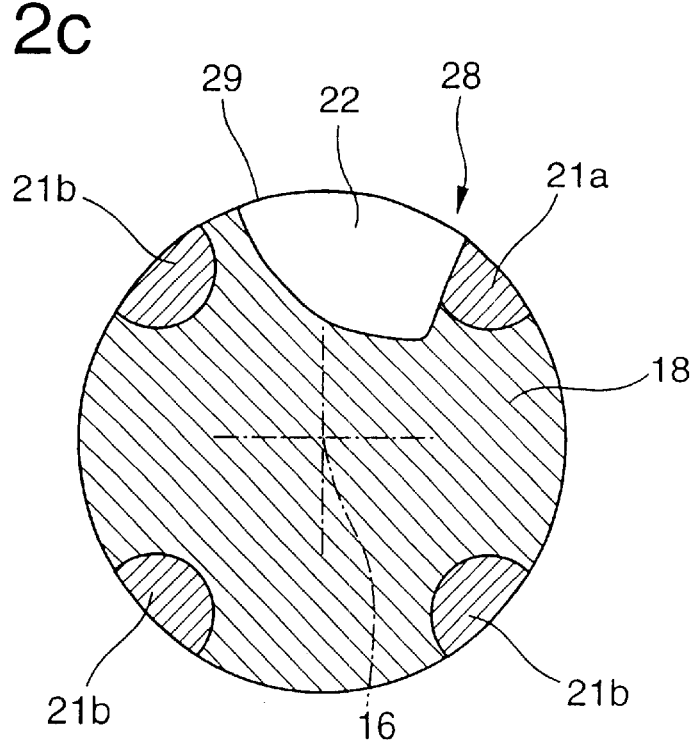
FIG. 2c shows a schematic sectional representation of an alternative embodiment, along the line I—I in FIG. 1.
Figure 3:
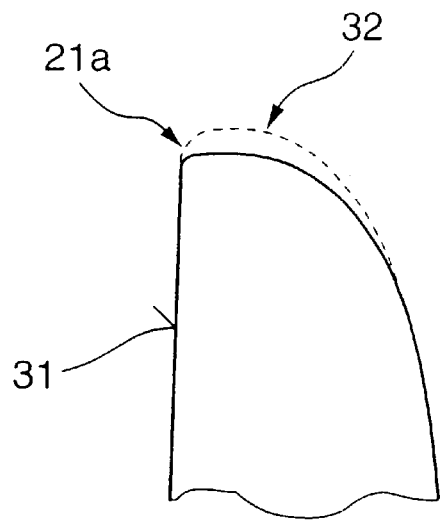
FIG. 3 shows an enlarged representation of a cutter according to the invention.

According to FIG. 1, the reaming tool is constituted as a multi-cutter reaming tool, the cross section of which is shown, by way of example, in FIG. 2b. The high hardness cutting materials 21 or hard material inlays are constituted as the chip removal element. Chip grooves 22 are machined which are in advance of the cutting materials 21, and which extend axially to the groove outlet region 23.

The shaped head 13 has main cutters 26 on its front end 24, merging into auxiliary cutters 27. The auxiliary cutters 27 are mainly for guiding purposes.

Four chip removal elements 21a are shown in FIG. 2b. The number of the chip removal elements is determined according to the number of hard material inlays 21 sintered into the base body 18 of the blank 17. This number can be higher or lower, specifically to the application. Furthermore, both an embodiment of the main cutters and auxiliary cutters 26, 27 distributed symmetrically over the periphery, and also an asymmetrical embodiment, can be provided, in which the distribution has different angles. The outer cutting edge 28 is situated on a flight circle diameter 29, which corresponds to the outer diameter of the blank 17 or can be smaller. The shape of the chip grooves 22 is machined in according to the specific application.

In a further alternative embodiment of a reaming tool 11 the blank 17 has four hard material inlays or hard material segments 21, and a single cutter reaming tool is constituted which has one cutter 21a as the chip removal element and three guide strips 21b as guide elements. It can alternatively be provided that the cutter 21a and guide strip 21b are provided mutually alternating. In this embodiment, the distribution of the high hardness cutting material 21 can also be symmetrical or asymmetrical. Likewise the number of the high hardness cutting materials 21 can be varied. Furthermore, the size and shape of the groove-shaped recesses 19 and also the twist angle can be selected and established according to the specific application.

The following paragraphs describe the process for producing the reaming tool according to the invention.

The shaft 12 is first brought into its shape by grinding. A centering aid is installed at its free end for reception of the blank 17. A centering aid is likewise incorporated into an end of the blank 17 facing the shaft 12, so that the blank 17 and the shaft 12 can be connected together by a material joint, and have a common axis of rotation 16. A non-positively and/or positively locking joint is also possible. The blank 17 can be arranged as a whole on the shaft 12. Alternatively, it can also be provided that the blank 17 is prepared as rod material, which is cut to size corresponding to the required length of the reaming tool to be made. Thus, for example, several disks can be separated from the blank 17, and one of these disks can be installed on the shaft 12. Thereafter an external diameter of the blank 17 is ground to the exact measurement of the flight circle diameter 29 of the cutter 21a. A chip groove 22 is cut in with a grinding wheel, preceding the cutter 21a in the direction of rotation. This grinding wheel can advantageously be profiled corresponding to the chip groove 22 to be made, so that the chip groove 22 can be made in one working step. The grinding wheel can then advantageously be moved in the direction of the hard material layer 21, so that the machining of the chip removal face 31 takes place. A nearly sharp cutter 21a can thereby be constituted. This sequence of processing has the advantage that there results no jump in hardness which would be given when the grinding wheel were to freely strike the hard material layer. Impact loadings of the grinding wheel on entry into the high hardness cutting material can thereby be substantially reduced. This advantageous processing sequence can insure that no so-called hanging nose 32 results as the cutter, but a nearly sharp-edged blade 21a can be embodied.

The geometry of the guide strip 21b and the geometry of the free surface of the cutter 21a can then be produced by means of a suitable control. Here more material is removed at the base body 18 than at the outermost point of the guide strip 21b and cutter 21a.

New chip geometries, in contrast to the heretofore known reaming tools with cutters and guide strips tipped with PCD, is made possible by this manufacturing technology according to the invention. In particular, these reaming tools have the advantage that twisted cutters and guide strips are provided, as a result of which the machining parameters and the surface quality can be increased. The advantage in comparison with cutters and guide strips of rectilinear construction, which were inserted on the periphery of the shaped head at a given angle to the long axis, is that by a subsequent grinding of the tool because of wear, the cutter and the guide point of the guide strips remain at their places on the axes in front cut (end section). A chip angle at the cutter can be kept accurately to 1° thereby, for example. With cutters of rectilinear constitution, which are arranged at a given angle, the middle of the cutter would be situated, after regrinding, in front of or behind the middle, seen in the direction of rotation. This would have as a consequence that the chip angle would become greater or smaller. This above all has a negative effect on the machining quality and the behavior in use. However, this disadvantage can be excluded by the advantageous embodiment of the reaming tool.

As an alternative to cutting the base body 18 with a grinding wheel, the production of the chip space geometry can be provided by other processes, such as, for example, erosion and a subsequent finishing grinding.

For the production of a multi-cutter reamer according to FIG. 2b, the groove-shaped recess 19 can have a geometry which is adapted corresponding to the course of the chip surface 31. This has the advantage that the wear of the grinding wheel can be reduced to a considerable degree. For example, this can be attained by a geometry as shown in FIG. 2b, in which the dashed-line arcuate segment 31a is not formed.

Figure 4:
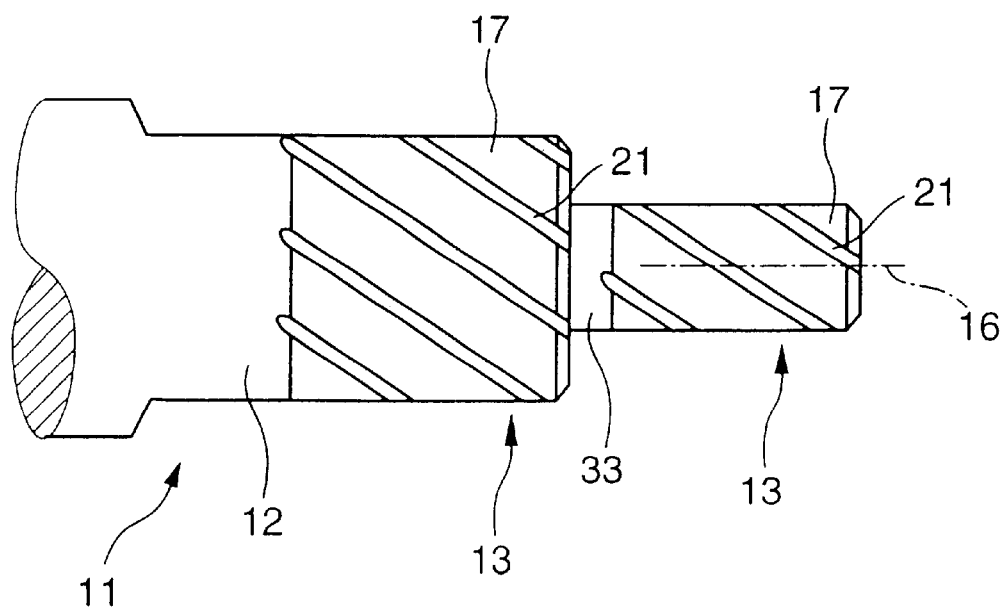
FIG. 4 shows a schematic representation of a multi-stage reaming tool according to the invention.

A multi-stage reaming tool 11 is shown in FIG. 4, and is provided for the machining of a two-step bore. In this reaming tool 11, a blank 17 with a smaller diameter is arranged on a cylindrical shaft portion 33, which in its turn engages on a blank 17 with a larger diameter, which in its turn is fastened to the shaft 12. The number of steps for constituting a reaming tool 11 is optional, as likewise are the diameter steps and also the length of the blanks 17. It can also be provided that the blanks 17 are arranged bordering directly on each other. Furthermore, it can be visualized that a reaming tool 11 is formed which has a blank 17 with a conical section. This can likewise be constituted as a reaming tool 11, in combination with cylindrical blanks 17. The number and constitution of conical blanks 17 and cylindrical blanks 17 in relation to the length and size and also their variations can be adapted to the respective case of application. Furthermore, for the machining a tool with a right-handed twist, or left-handed twist, or no twist, can be provided. The twist angle is freely selectable and is determined according to the case of application.

I claim:

1. A high precision multi cutter reaming tool with a shaft and a head on which at least one cutter is provided, in which said head is produced from a blank that comprises a base body of a base material with an envelope surface with at least one substantially rectilinear or helical groove-shaped recess running around it into which at least one high hardness cutting material is sintered and in which a chip groove adjoins said cutter, wherein said high hardness cutting material comprises at least one said cutter having cutting surfaces formed by the introduction of said chip groove by a grinding wheel into said base body, and movement of said grinding wheel toward said high hardness cuffing material, said head having main cutting edges and auxiliary cutting edges, said auxiliary any cutting edges following said helical groove-shaped recess, said main cutting edges being formed at chamfers at a front face of said head, and a circumference of said head being ground before working said chip groove.

2. The reaming tool according to claim 1, in which said at least one high hardness cutting material comprises a PCD material.

3. The reaming tool according to claim 1, in which said at least one high hardness cutting material comprises a CBN material.

4. The reaming tool according to claim 1, in which said groove-shaped recess satisfies at least one of the following twist conditions: right-hand twist, left-hand twist, and no twist.

5. The reaming tool according to claim 1, in which said cuter is seated by a groove-shaped seating.

6. The reaming tool according to claim 1, further comprising a plurality of blanks connected together.

7. The reaming tool according to claim 6, in which said plurality of blanks have different diameters.

8. The reaming tool according to claim 1, in which the length of said blank depends on the length of an auxiliary cutter or of said at least one cutter.

9. The reaming tool according to claim 1, in which said groove-shaped recesses are uniformly distributed over the periphery of said head.

10. The reaming tool according to claim 1, in which said groove-shaped recesses are non-uniformly distributed over the periphery of said head.

11. The reaming tool according to claim 1, in which said groove-shaped recesses are recesses selected from circular recesses, V-shaped recesses and right-angled recesses.

12. The reaming tool according to claim 1, in which said base body comprises metal selected from hard metal and tempered steel.

13. A process for production of a multi cutter reaming tool with a shaft and a head with at least one cutter, comprising the following steps, in order:

at least positively connecting a shaft to a blank that has at least one groove-shaped recess arranged on its envelope surface into which at least one high hardness cutting material is sintered, bringing the external diameter of said blank to the dimension of the flight circle diameter of said at least one cutter, producing at least one chip groove in said blank with a grinding wheel, moving said grinding wheel toward said recess receiving said high hardness cutting material, and bringing a chip surface of said at least one cutter to said dimension.

14. A process for production of a multi cutter reaming tool with a shaft and a blank, with at least one cutter, comprising the following steps, in order:

positively connecting said shaft to a blank that has at least one groove-shaped recess arranged on its envelope surface into which at least one high hardness cutting material is provided, bringing the external diameter of said blank to the dimension of the flight circle diameter of said at least one cutter, producing at least one chip groove in said blank with a grinding wheel, and bringing said at least one cutter to said dimension.

15. The process according to claim 13, further comprising incorporating a centering aid into an end of said blank facing said shaft before machining said blank.

16. The process according to claim 13, further comprising grinding said at least one cutter to said dimension.

17. The process according to claim 13, further comprising bringing said at least one cutter to said dimension in a path-controlled manner.

18. The process according to claim 13, further comprising employing a profiled grinding disk for production of said at least one chip groove.

\* \* \* \* \*